Sept. 23, 1947.  M. MORRISON  2,427,920
SELECTIVE CONSTANT-SPEED INDUCTION MOTOR
Filed Nov. 13, 1943
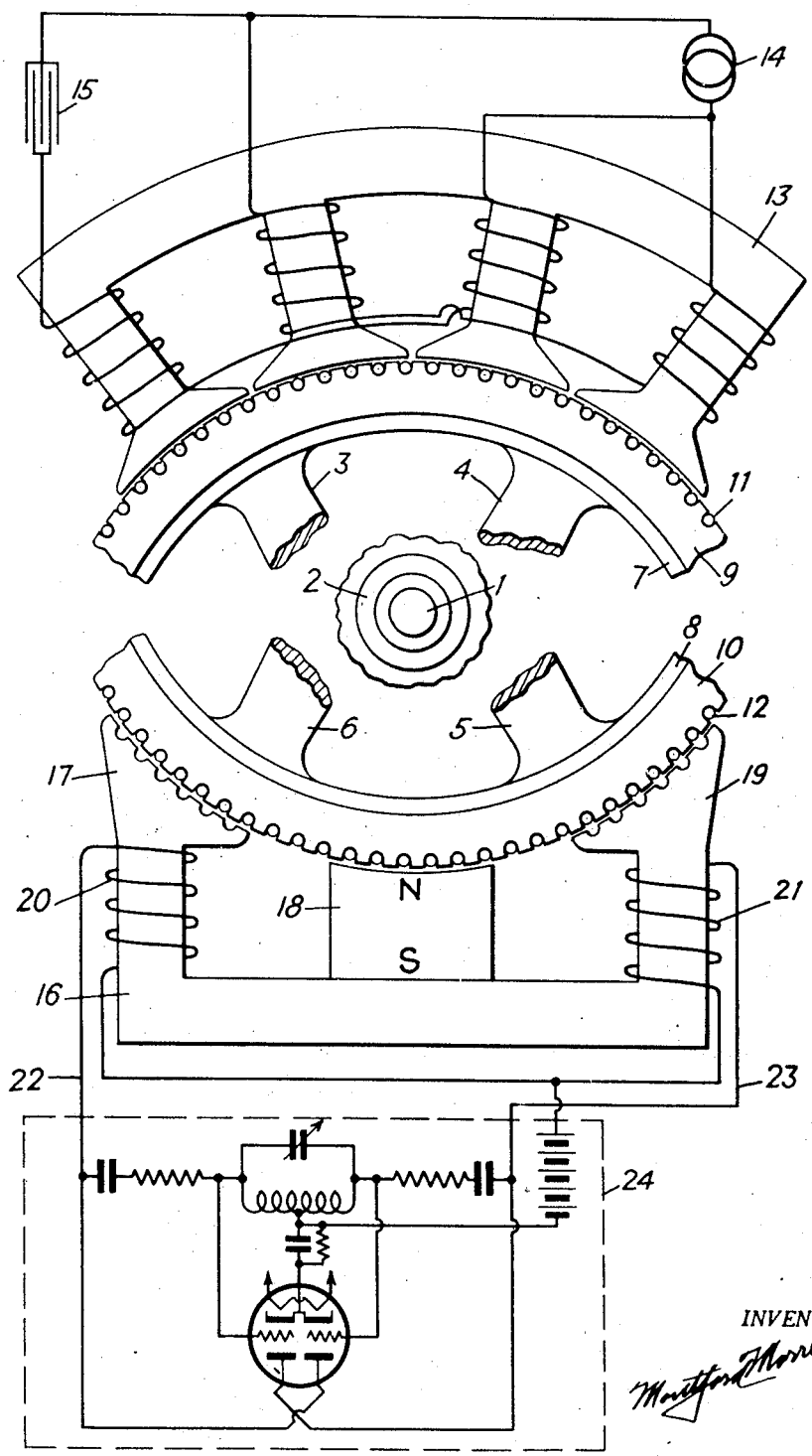
INVENTOR.
Montford Morrison Patented Sept. 23, 1947

2,427,920

UNITED STATES PATENT OFFICE 2,427,920

SELECTIVE CONSTANT-SPEED INDUCTION MOTOR

Montford Morrison, Upper Montclair, N. J.

Application November 13, 1943, Serial No. 510,173

3 Claims. (Cl. 172—278)

The present invention relates to dynamoelectric machines and relates in particular to slow-speed electric motors and specifically relates to sound reproducer electric drives.

Among the objects of the invention are: to provide a fixable but highly constant-speed electric motor; to provide in such a motor a structure which may be operated at comparatively very low speeds such as, of the order of one revolution per minute; to provide a simple and reliable method of regulating the speed of such a motor; and to provide these features for sound reproducer motor-drives, without the employment of gears or any movable parts other than those required for the turntable proper.

In the prior art, particularly in the field of multiplex telegraphy, phonic-wheel motors have been used to provide constant speed operation of certain devices. These phonic-wheel motors have been operated directly by contact making tuning forks, or by tuning forks operated through electronic amplifiers. In some cases the phonic-wheel motor has had added to it a separate driving motor to supply some of the synchronous torque demanded by the device driven, as well as to provide starting torque for the motor-set, since the phonic-wheel motor possesses none.

These phonic-wheel motors are in effect synchronous reaction type induction motors with the difference that the rotor is not supplied with a squirrel-cage or other winding and therefore is not self-starting.

Also in the prior art, particularly in the X-ray apparatus field, synchronous reaction type induction motors provided with squirrel-cage rotors having salient poles formed by a grouping of slots, has been common practice during the period of the use of mechanical rectifiers in that art.

Further in the prior art, particularly in the watch-recorder art, the rate of watches is compared by means of a small phonic-wheel synchronous motor operated by power supplied by a highly constant alternating-current source, derived by electronic power amplification from a compensated electrically driven tuning fork.

In the art of controlling the speed of electric motors by tuned or otherwise resonant circuits, the problem of acquiring high apparatus efficiency and sharp tuning in electronic circuits, precludes the practical or efficient use of power frequencies for this purpose.

However, the applicant has discovered that the rotor slot-frequency, in the case of alternating-current motors, and the commutator bar frequency, in the case of direct-current motors, may be used to provide the higher frequencies required in the economic and efficient use of motor speed frequencies to control motor speeds.

In the case of a small alternating-current motor the rotor slot-frequency is always, in good designs, many times the frequency of the driving power source, and in the case of the direct-current motor the commutator bar frequency may be one or several times the armature slot-frequency.

In no case in the prior art has the rotor slot-frequency of the driving motor proper been employed for this purpose.

In the employment of an alternating voltage generated at the rotor slot-frequency, many different structures and methods may embody this invention.

The slot-frequency effect may be in the form of a voltage obtained by generator effect and this generated voltage may work into any one of an entire group of different but effective circuits. Also this slot-frequency effect may be produced in the form of a variable reactance without the spontaneous generation of voltage, in which case some external source of suitable power is required.

Other and further features and objects of the invention will be obvious and pointed out in the reading of the description hereunder, particularly when taken in connection with the drawing which illustrates one embodiment of the invention, partly in elevation and partly diagrammatic.

Referring to the drawing, 1 is a motor shaft having a hub 2 from which the spokes have been broken away. 3, 4, 5 and 6 are spokes shown as broken away but in fact are those attached to hub 2. 7 and 8 constitute segments of one and the same rim of a rotor of an alternating-current motor having a suitably laminated active iron section illustrated by the numerals 9 and 10.

The rotor is broken into segments in order to contract the longitudinal dimension of the figure to allow for greater detail in important parts thereof.

In the present embodiment, the laminated sections 9 and 10 are provided with open slots 11 and 12, having embedded therein a squirrel-cage winding, as is well understood in the art.

The stator member 13 represents diagrammatically a form of stator structure and winding common in the so-called capacitor type induction motors and is illustrated as a two-phase stator supplied with alternating-current from source 14 and employing capacitor 15 to provide the phase difference required, as is common practice in the art.

Stator member 16 is provided with three polar members, 17, 18 and 19. Polar member 17 is provided with a winding 20. Polar member 18 is illustrated in the embodiment as a permanent magnet supplying a source of continuous magnetic field for stator member 16, as will be more fully described hereinafter. Polar member 19 is provided with a winding 21 connected in series with winding 20, said winding having terminal conductors 22 and 23.

In the present embodiment, the laminated active iron member of the rotor indicated by numerals 9 and 10, is provided with slots equal to the tooth width, as illustrated in the figure.

The face of polar member 17 is provided with slots and teeth to match those of the rotor, namely, equal slot and tooth widths. Likewise, polar member 19 is provided with teeth and slots similar to those of polar member 17, but the angular displacement of the slots in polar member 17, with reference to the positions of the slots in polar member 19, referred to the axis of the rotor, is such that when the teeth of polar member 19 are in registration with the teeth of the rotor, as illustrated in the figure, the teeth of the face of polar member 17, are in registration with the slots of the rotor and obviously this position of slot registration between the rotor and polar members 17 and 19, reverses with each angular progression of rotation of the rotor equal to a slot or tooth width thereof.

It will be appreciated by those skilled in the art that when the pole teeth are in registration with the rotor teeth there is produced a low magnetic reluctance path between the two members, and when the pole teeth are in registration with the slots of the rotor, there is produced a higher reluctance path between the two said members.

With the constant magnetic field member 18, which obviously may be an electro-magnet if and when desired, the magnetic field produced thereby circulates through coil 21 when the teeth of polar member 19 are in registration with the teeth of the rotor, and the said magnetic field circulates through coil 20 when the teeth of polar member 17 are in registration with the rotor teeth.

When the rotor of the motor device described revolves, alternating-current is generated between the terminals 22 and 23 at the slot-frequency of the rotor, as is well understood by those skilled in the art.

With the employment of polar member 18, producing a continuous magnetic field, the stator member 16 becomes in fact a generator. If no continuous field is provided by member 18, but instead a non-magnetized element, the stator member 16 becomes a variable reactance pulsating in value at the slot-frequency, under operation.

Stator member 16 may be constructed as a generator but may function as a motor, depending upon whether at the instant of consideration the stator member 16 is receiving energy from an external source or delivering energy to such a source. This property of switching from the role of a generator to a motor is common to practically all parallel operated dynamoelectric machines, as is well understood.

The circuit contained within the dotted area 24, may be any one of a group of circuits, but in the present embodiment is a tuned-grid feedback oscillator employing coils 20 and 21 in push-pull operation. The function of the circuit in the dotted area 24 is to supply alternating-current for coils 20 and 21 only at any substantial value, when the rotor slot-frequency is in the near vicinity of the tuned-grid frequency of the oscillator illustrated in the dotted area 24.

This oscillator circuit 24, cooperating electrically with a stator such as 16 in the absence of a driving stator 13, is fully disclosed and described in my co-pending application Serial No. 496,389, filed July 28, 1943, but the pertinent characteristics hereto will be hereinafter discussed.

In the structure just described, the tuned grid oscillator 24 supplies maximum energy to the stator member 16 only if and when the pulsating stator reactance matches the tuned frequency of the grid circuit of the oscillator and this is of course when the slot-frequency is in the near vicinity of the tuned-grid frequency.

If the rotor speed drops such that the slot-frequency is below the above stated value, in general it can be said that the oscillator 24 supplies energy to the rotor and tends to bring it up to the speed corresponding to the tuned-grid frequency, whereas if the rotor speed tends to exceed a value which produces a slot frequency above the tuned-frequency value of the grid circuit of oscillator 24, oscillator 24 tends to load the rotor and pull it back to the speed corresponding to the frequency of the tuned-grid circuit.

Thus, although stator member 16 is constructed as a generator it may function either as a generator or as a motor, depending upon the operating conditions imposed upon it.

Further, the circuit enclosed in 24 may be, if and when desired, not an electronic oscillator circuit at all, but a tuned circuit employing an electric-wave filter, preferably of a band-pass or a high-pass type. Since member 16 is a generator, it may be said to be critically loaded by a sharply tuned filter. This type of loading on such a strator, is fully described and illustrated in my co-pending application, Serial No. 506,339, filed October 15, 1943.

In the case where stator member 16 contains no continuous source of magnetic field energy and functions purely as a variable reactance, the circuit within 24 may then be any source of suitable alternating-current, the device then reduces itself to an alternating-current-control phonic-wheel motor formed by the novel structure of employing the slots in a driving-motor rotor to form the phonic-wheel rotor structure.

In this case the apparatus is more simplified in structure, more efficient and more reliable in performance, than its predecessors in the form of motor-generator sets with separate rotors and low frequency control circuits which are difficult to maintain, and often unreliable, in operation.

Many modifications and equivalents may be resorted to in the embodiment of this invention in practical devices and particular attention is directed to the fact that although in the embodiment illustrated, and in the claims hereunder, the secondary coils referred to are described by a term which identifies them with a stator, it is quite obvious to anyone skilled in the art that the secondary coils may be in the rotor if and when desired, though usually such a structure results in a more expensive and less efficient form.

A critical frequency response is defined herein to be a response which changes from one-rate-of-change with the applied frequency, to a different rate-of-change with the frequency, within some range of operating frequency under operation.

An induction stator winding is defined, as used herein, as a winding in a dynamoelectric machine, which under proper alternating-current circulation therein, produces in the rotor of said machine, a useful torque at all rotor speeds under synchronous rotor speed, and an inductor stator winding is defined as one which, under similar conditions, produces useful torque in the rotor only at rotor speeds in the vicinity of synchronous rotor speed. Useful voltage may be substituted for useful torque in the above definition.

It will be appreciated by those skilled in the art to which this invention appertains, that electronic tube oscillators are also electronic tube amplifiers, since amplification is the operation upon which oscillators depend to produce continuous oscillations. Further, that properly tuned electronic tube amplifiers oscillate under suitable regenerative reaction. Therefore, as to whether a device is an oscillator or an amplifier operating under regenerative reaction, may be purely a matter of viewpoint and not one of structural or operative difference. The claims hereunder are written in the light of these statements.

Having described one embodiment of my invention and having taught how to make and use same, the scope thereof is set forth in the claims hereunder.

What I claim is:

1. In an induction dynamoelectric machine, a single rotor having a winding embedded in open slots formed between teeth in the periphery of said rotor, said winding being adapted to impart accelerating torque to said rotor under relatively low-frequency peripherally-traveling magnetic-flux linkage, said teeth being formed to provide salient poles on said rotor and adapted to impart synchronous torque to said rotor under relatively high-frequency peripherally-pulsating magnetic-flux permeation, a stator for said rotor, a stator winding connected to a relatively low-frequency source providing said linkage, and a stator winding connected to a relatively high-frequency source providing said permeation.

2. In an induction dynamoelectric machine, a single rotor having a winding embedded in open slots formed between teeth in the periphery of said rotor, said winding being adapted to impart accelerating torque to said rotor under relatively low-frequency peripherally-traveling magnetic-flux linkage, said teeth being formed to provide salient poles on said rotor and adapted to impart synchronous torque to said rotor under relatively high-frequency peripherally-pulsating magnetic-flux permeation, a stator for said rotor, a stator winding connected to a relatively low-frequency source providing said linkage, and a stator winding coupled to the plate circuit of a vacuum tube oscillator having a frequency substantially independent of said winding.

3. In an induction dynamoelectric machine, a single rotor having a winding embedded in open slots formed between teeth in the periphery of said rotor, said winding being adapted to impart accelerating torque to said rotor under relatively low-frequency peripherally-traveling magnetic-flux linkage, said teeth being formed to provide salient poles on said rotor and adapted to impart synchronous torque to said rotor under relatively high-frequency peripherally-pulsating magnetic-flux permeation, a stator for said rotor, a stator winding connected to a relatively low-frequency source providing said linkage, and a stator winding coupled to the plate circuit of a vacuum tube oscillator having a stabilized feedback circuit between said winding and said oscillator.

MONTFORD MORRISON.

REFERENCES CITED

The following references are of record in the file of this patent:

UNITED STATES PATENTS

| Number | Name | Date |
| --- | --- | --- |
| 1,994,230 | Purington | Mar. 12, 1935 |
| 1,856,076 | Karlous | May 3, 1932 |
| 2,103,165 | Merrill | Dec. 21, 1937 |
| 2,103,356 | Fisher | Dec. 28, 1937 |

OTHER REFERENCES

Article entitled "A Tube-controlled Motor" by Paul B. King, Jr.; Electronics, Jan. 1936, McGraw-Hill (1130).